United States Patent [19]

Frissora et al.

[11] 4,399,808
[45] Aug. 23, 1983

[54] DRAINABLE SOLAR COLLECTOR UNIT

[75] Inventors: Joseph R. Frissora; Michael H. Platt, both of Corning, N.Y.

[73] Assignee: Owens-Illinois, Inc., Toledo, Ohio

[21] Appl. No.: 288,968

[22] Filed: Jul. 31, 1981

[51] Int. Cl.³ .............................................. F24J 3/02
[52] U.S. Cl. ..................................... 126/420; 126/443
[58] Field of Search .............. 126/437, 435, 443, 420, 126/423; 137/68 R, 69; 237/80; 165/168, 170

[56] References Cited

U.S. PATENT DOCUMENTS

| 1,345,758 | 7/1920 | Folsom | 126/438 X |
| 2,167,576 | 7/1939 | Kiser | 126/443 X |
| 3,913,835 | 10/1975 | O'Brien | 237/80 X |
| 3,915,147 | 10/1975 | Rineer | 126/443 X |
| 4,232,655 | 11/1980 | Frissora et al. | 126/443 X |
| 4,346,731 | 8/1982 | Sigworth, Jr. | 126/418 X |

Primary Examiner—Samuel Scott
Assistant Examiner—Randall L. Green
Attorney, Agent, or Firm—John R. Nelson; M. E. Click; D. H. Wilson

[57] ABSTRACT

The disclosure relates to an improved venting arrangement for a solar energy collecting device of the type wherein a double walled tubular-type structure is employed with the outer wall of the inner tube carrying a solar absorbent coating and the interior of the inner tube being periodically filled with a heat transfer fluid. To prevent such heat transfer fluid from completely filling the inner tube, and thus establishing an undesirable siphoning action, and to concurrently permit the unrestricted venting of air out of the inner tube during filling and into the inner tube upon drainage of the fluid therefrom, this disclosure provides a vent tube extending into the upper regions of the inner tube and having a floatable valve structure mounted on its upper end and arranged so as to effect a seating of the valve and the closing of the vent tube when the fluid level in the inner tube reaches a desired height. Conversely, upon drainage of the inner tube, the valve will open to freely permit air flow into the tube and prevent the trapping of fluid therein.

3 Claims, 3 Drawing Figures

U.S. Patent  Aug. 23, 1983  4,399,808
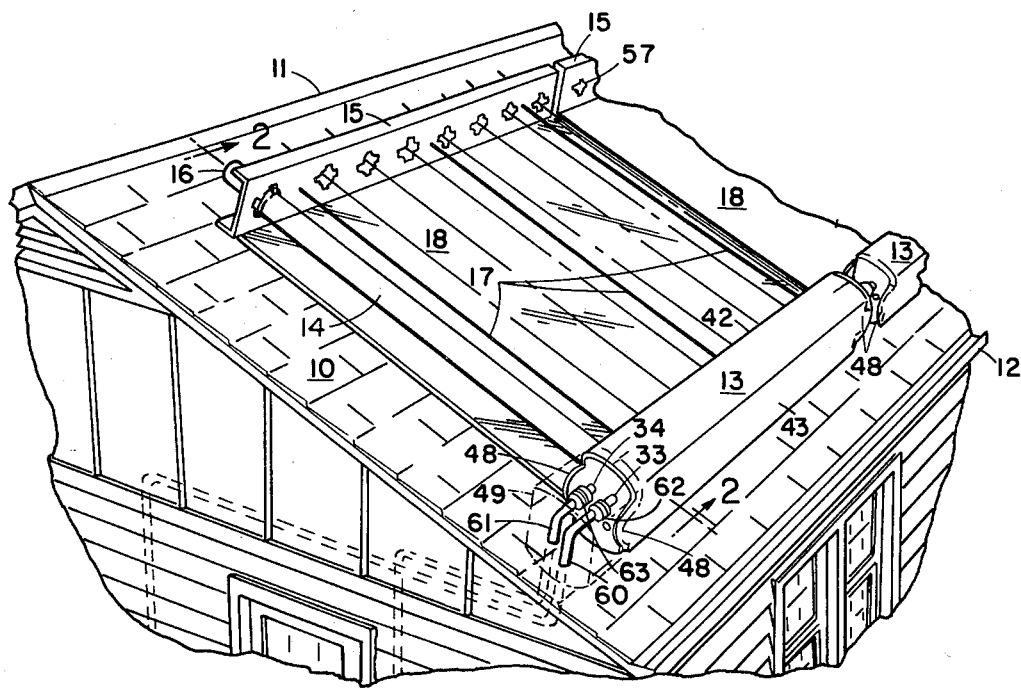
FIG. 1
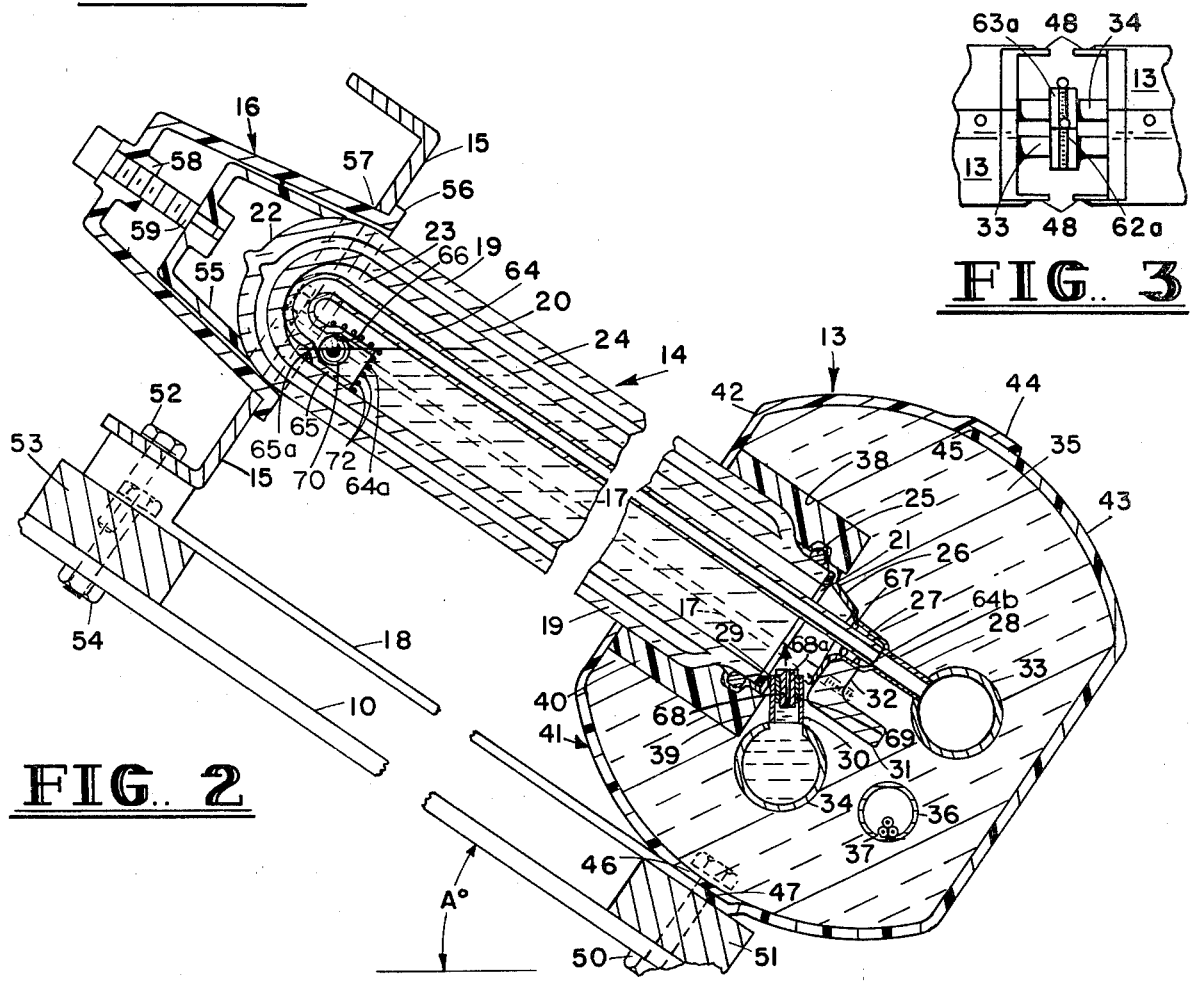
FIG. 2
FIG. 3

DRAINABLE SOLAR COLLECTOR UNIT

BACKGROUND OF THE INVENTION

The invention relates to an improved solar energy collecting device of the type wherein a heat transport liquid is periodically circulated between a solar energy collection area and a thermal energy storage and exchange device. In particular, the invention constitutes a specific improvement in the construction of the double walled thermal energy absorbing unit employed in the solar energy collection apparatus described and illustrated in detail in U.S. Pat. No. 4,232,655 to Frissora et al.

In the Frissora et al. patent, a solar energy collection apparatus is disclosed comprising a plurality of double walled energy absorbing glass tubes. Such tubes have the space between the walls evacuated and the inner wall has a solar energy absorbing coating on its exterior surface. One end of the inner tube is provided with connection means for the successive introduction and withdrawal of a heat transfer fluid, generally water, from the interior of the inner tube. To conveniently permit the periodic filling of the inner tube with the heat transfer fluid, and the subsequent withdrawal of the heat transfer fluid, a venting tube is provided which extends into the upper portions of the inner wall tube and provides at its lower end a connection to a venting manifold which normally communicates with the top of a fluid storage tank. Such venting tube permits the ready exhaustion of air from the inner tube during the initial filling operation and then functions to control the maximum height of the heat transfer fluid introduced into the inner tube by draining off such fluid through the vent tube at a rate equal to that at which it is introduced from the supply manifold. Care must be taken, however, to insure that the rate of supply of heat transfer fluid does not exceed the rate of withdrawal of fluid through the venting tube so as to effect the forcible discharge of all air from the top of the inner heat transfer tube. Once a solid column of water is established in such tube, undesirable siphoning action can take place which would have a deleterious effect on the operation of the entire system.

Those skilled in the art will recognize that any constricted area vent tube can become accidentially clogged with particulate or fibrous material accidentally introduced into the system. If this occurs, it becomes impossible to fill the tube to the desired level, and, more importantly, to withdraw all of the heat transfer fluid due to creation of a vacuum block at the top of the fluid in the tube.

SUMMARY OF THE INVENTION

This invention provides an improved heat transfer apparatus for a solar energy collecting system of the type employing vertically inclined double walled tubes. In accordance with this invention, the venting tube controlling the filling and withdrawal of fluid from the inner energy collecting tube, is provided at its upper end with an inverted loop, thus disposing the open end of such loop in a downwardly facing position. The open end is also outwardly flared so as to define an annular valve seat. A floatable ball or similar type valve is mounted in the inverted open end of the vent tube so as to cooperate with the annular seating surface when the fluid level of the heat transfer fluid in the inner wall tube reaches the approximate level of the valve seat. Hence, any further introduction of heat transfer fluid into the inner wall tube is effectively prevented by a build up in pressure of the remaining air contained in the top of the tube which is effectively trapped therein due to the closing of the valve in the vent tube. Upon withdrawal of heat transfer fluid, the valve opens to vent the upper end of the tube and permit complete drainage.

Other objects and advantages of this invention will become apparent to those skilled in the art from the following detailed description, taken in conjunction with the annexed sheet of drawings on which there is shown a preferred embodiment of this invention.

BRIEF DESCRIPTION OF THE DRAWINGS

FIG. 1 is a perspective view of a drainable, evacuated tubular solar collector embodying this invention and shown in operating position on the pitched roof of a building.

FIG. 2 is a sectional view taken along the line 2—2 of FIG. 1.

FIG. 3 is a fragmentary view of the connection between two modules or sections of the collector shown in FIG. 1.

DESCRIPTION OF THE PREFERRED EMBODIMENT

Referring to FIGS. 1-3, the drainable solar collector is illustrated in an operating installation on the roof 10 of a building. The roof has some pitch from the upper ridge 11 to the eaves 12. In the illustrated example on FIG. 1, a pitch of about 20° (the angle A) above horizontal is used. (The collector's pitch angle A is variable from very near 0° to near 80°). The solar collector is preferably installed on a southern exposure (northern hemisphere) of the building such that the axis of manifold 13 lies in the east/west direction and the axes of the parallel array of plural solar collector tubes 14 (but one of which is shown on FIG. 1 for simplicity of illustration) are in the north/south direction. Accordingly, the sun during a "solar day" moves from right to left on FIG. 1 across tubes 14. The tubes 14 are assembled in a modular unit, or units (two of which are indicated on FIG. 1), which comprise the manifold 13, the upper bracket channel 15, tube and caps 16 and the tie rods 17 threaded at their ends and bolted at one end in the manifold (as will be presently described) and bolted at the other end to the channel bracket 15. The modular unit also includes some form of backside reflector, which is in the form illustrated a planar diffuse reflector surface 18, such as disclosed in U.S. Pat. No. 4,002,160, or may incorporate shaped reflectors as is disclosed in U.S. Pat. No. 4,091,796, or in U.S. Pat. No. 4,002,499.

As shown on FIG. 2, the solar collector tube 14 is comprised of a double wall glass hollow test-tube shaped element having a transparent glass outer wall 19 and radially spaced inner wall 20. Tube 14 is preferably on the order of 2½ inch O.D. and 4–7 foot length. The outer surface of inner wall 20 is coated with a wave length selective coating and the outer wall 19 is sealed by annular fusion with the inner wall 20 near or at the open end 21 of the double wall glass tube. The enclosed annular space 24 between walls 19 and 20 surrounding the tube is evacuated to a hard vacuum on the order of $10^{-4}$ Torr and tipped-off in conventional fashion at a tubulation on the closed end 22 of the tube. Inside wall 20 defines an interior chamber 23 open at the one end. The tube 14 as constructed is described more completely in the patent to Pei, U.S. Pat. No. 4,043,318. This comprises an advanced glass, evacuated tubular solar collector element that is highly efficient in converting solar radiation into thermal energy at the tube interface on wall 20. The energy conversion from solar to thermal is accomplished by the coating on wall 20, and in the use of selective coatings, this conversion is relatively, highly efficient (on the order of 70% efficiency).

The solar tube 14 is connected onto a manifold 13 by a ring gasket or grommet 25 in the flange of an annular receptacle or cup 26 of the manifold. There are a plurality of the cups 26 spaced along one side of manifold 13 and each cup opening is facing the same direction. The center axes of cups 26 are substantially parallel. In a preferred construction, cup 26 and a pipe fitting 27 are assembled in the cup bottom by brazing, soldering or the like. The pipe fitting 27 has a lower reduced end pipe 28 that depends in an axial direction from the cup 26. For simplicity of construction, the pipe fitting 27 is placed off center of the bottom of cup 26 on what will eventually be the high elevation side thereof when assembled for operation (see FIG. 2). Along tapered sidewall 29 of the cup 26 and opposite the pipe fitting 27 is a second aperture adjacent the bottom end of cup 26 into which a stub-pipe 230 is firmly fastened. The axis of the stub-pipe 30 is located at the low elevation side of the cup in the manifold when assembled for operation (see FIG. 2).

In the assembly of the manifold parts, a steel or structural angle member 31 includes arcuate, spaced-apart notches (not shown) on its upper flange 32 which receive the depending pipe fittings 27 and nest them in place. The bottom end of cups 26 butt on the top of flange 32. This places the cups in their proper attitude for operation, as will become more apparent hereinafter, and the manifold is further fabricated by placing two larger diameter header pipes in place and attaching the connections to the cups, as follows. The end 28 of pipe fitting 27 is securely fastened (e.g. by brazing or soldering) at a preformed opening in air header pipe 33. Pipe 33 extends the length of manifold 13. Preferably the air header pipe 33 is metal, i.e., copper or brass, which provides a suitable material match with cup 26 and pipe fitting 27. The holes for connecting the ends 28 of the series of fittings of the cups are formed along the length of pipe 33. In a similar manner, the second pipe, which is water header pipe 34 made of a similar material, has the spaced predrilled holes to receive the outer open ends of stub-pipes 30, which are likewise securely fastened, i.e., brazed or soldered, onto the pipe 34 thereby connecting each of them into pipe 34.

The manifold insulation 35 is molded around the metal structure, just described, to form the manifold as shown on FIGS. 1 and 2. Additionally, the manifold includes a lengthwise conduit 36 which will receive electric control wires 37 as needed to connect the control sensors and the like. This is added in the manifold structure so that electrical components used with any of the tubes 14 of a collector module or a series of modules may be conveniently located and installed in the system. The manifold insulation 35 is preferably a cellular, lightweight material, such as foamed polyurethane of about 3 lb. per cu. ft. density. The mold in forming the insulation 35 matches with the tops of cups 26 to define annular ports each defined by a continuous side 38 (FIG. 2) and end 39. These ports open along one side of the manifold which will face the high elevation of manifold 13 when the solar tubes 14 are assembled. Foam (rubber or synthetic) inserts prefabricated as cylindrical sleeves 40 are placed in the ports of the manifold and fit adjacent the mouth flange of cups 26. Cylinder sleeves 40 will be compressed by the glass wall 19 of each tube 14 as it is placed in a cup 26 in assembled position. The sleeve 40 being of the compressible material mentioned assures a liquid tight seal of each tube 14 in manifold 13 keeping out rain, moisture or the like. The sleeve further insulates against heat loss or heat transmission at the solar tube's connection in the manifold. The exterior of the insulation 35 is covered with a formed shell 41, which is preferably molded from a fiber glass reinforced, resin sheet as two complementary half segments 42 and 43. The edge 44 of top segment 42 is offset outwardly to overlap with the adjacent edge 45 of lower segment 43. In a similar way the other edge 46 of the bottom segment 43 is outwardly offset and overlaps on the edge 47 of the top segment. The overlaps at 44, 45 and at 46, 47 are fastened together, such as by rivets, to finish the manifold.

As shown on FIG. 1, the opposite ends of the shell for the manifold modular sections include parallel arcuate tabs 48. Prefabricated, half section inserts 49 (in dotted outline on FIG. 1) are placed at the ends of the modules and similar inserts (not shown) are secured in place between modules connected to one another in end-to-end fashion. Intermodular connection of the pipes 33 and 34 is shown on FIG. 3.

As may be seen on FIG. 2, the manifold 13 of a module is attached by nut-bolt fasteners 50 extending through the overlap layers 47, 46 of manifold shell 41, through a stringer member 51 and the roof 10, fastening it in place. It is important that the manifold be pitched down from its end toward the pipe connections for the piping circuits 60 and 61 of the system. Utilizing a pitch angle of about 2° from horizontal will fully drain the collector. At the upper end of the module the bracket channel 15 is fastened by cap screw 52 into an upper stringer member 53 attached to roof 10 by nut-bolt fasteners 54. The reflector, such as a white panel 18, is attached for support by the stringer members 51 and 53.

Tubes 14 are held seated in cups 26 by an end cap device which includes truncated inner cup 55 made of plastic engaging its closed end and an outer plastic truncated cup 16. The outer cup extends through a splined aperture 57 formed in the vertical web of the channel bracket 15 (see FIG. 1). The edge of cup 16 at its large open end has radially extending spaced bosses 56 which match in size and location with the spline cut-outs of the aperture 57 in the bracket 15 so that outer cup 16 and inner cup 55 may be assembled from the side of bracket 15 opposite the manifold. In assembly, the tube 14 is inserted through an aperture 57 and the open end 21 is seated in manifold cup 26 inside gasket 25. The inner cup 55 is placed over the protruding closed end 22 of the tube 14 and outer cup 16 concentrically placed over cup 55 such that the outwardly flanged bosses 56 thereof (FIG. 2) pass through the spline cut-outs of aperture 57 (FIG. 1). After bosses 56 are through aperture 57, the outer cup 16 is twisted (rotated) to lock bosses 56 along the manifold side of bracket 15. Tension is applied to axially load tube 14 in the manifold cup 26 by tightening the center screw 59 in the threads of the journal aperture 58 at the closed end of cup 16 against the closed end of inner cup 55. This loading by tightening screws 59 holds the tube 14 in the manifold cup 26. The end bolted tie rods 17 spaced along the module fasten the bracket 15 and the angle member 32 in the manifold together mechanically to prevent the manifold's buckling; in other words, the manifold 13 is tied rigidly to the bracket channel 15 by the series of rods 17. The rods 17 are disposed along the bracket and manifold, respectively, at spaced intervals located between certain of the tubes 14.

The solar collectors being in place, as described, the one header pipe 33 is connected to a pipe 60 (FIG. 1) of the solar tank system by a hydraulic clamp-style coupling 62; and the other header pipe 34 is similarly connected to a pipe 61 of the solar tank system by the same style of coupling 63. The successive modules mounted in a line along the roof are connected (FIG. 3) together by a hydraulic coupling 62a connecting the lengths of header pipe 33 to each other and a hydraulic coupling 63a connecting the lengths of header pipe 34 to each other. The far ends of the last module in the installation have the pipes 33 and 34, respectively, capped and sealed so as to close the end of that pipe.

With reference to FIG. 2, as a key part of the assembly of the tubular collector and manifold in the closed system of the drainable collector of this invention, the pipe fitting 27 in each cup 26 receives an air vent tube 64. Preferably, tube 64 is glass, such as laboratory or chemical tubing. The vent tubes 64 are desirably of equal length and each extends such that its open upper end 64a is near the top of the chamber 23 within the tube 14. The lower end 64b of tube 64 is seated in an annular gasket 67 held in the large section of pipe fitting 27.

Another key part of this assembly for each tube is the orifice insert 68 placed in the innermost end of the stub-pipe 30 in the water line and held by a tube-like gasket 69. The insert 68 has a precise size of axially extending passageway 68a bored through it to connect water in pipes 34, 30 to the chamber 23 inside solar tube 14. The insert 68 may take other forms such as by threading it in pipe 30 or swaging it therein, etc; however, it is desirable to remove inserts 68 from time to time for operational reasons or for maintenance. Therefore, it is desirable to provide a readily removable insert in pipe 30.

As is described in detail in the aforementioned Frissora et al. U.S. Pat. No. 4,232,655, the solar energy collection system thus far described may be operated in conjunction with a heat transfer and storage tank in two modes, respectively a continuous circulation mode or a continuous batch mode. This invention is particularly applicable to the operation of the aforedescribed solar collector in the continuous batch mode of operation.

In this mode of operation, the chamber 23 inside solar tube 14 is filled with heat transfer fluid, which may conveniently be distilled water, through the pipe line 61 which extends to pumps connected to a heat storage and transfer tank (not shown) in the manner described and illustrated in detail in the aforementioned U.S. Pat. No. 4,232,655. The air vent tubes 64 are interconnected by the air header pipe 33 and connected to the top portions of the heat transfer and storage tank (not shown) through conduit 60. In accordance with this invention, the height of fluid fill of the solar energy absorbing tube 14 is controlled by a valving unit 70. In contrast to prior art constructions, the top end of the venting tube 64 is bent into a U-shaped configuration so that the open end 64a of such tube is facing downwardly. Additionally, the downwardly facing portions of the tube 64 are somewhat radially enlarged as shown at 65 so as to define a valve seat 66 which cooperates with a floatable valve element 70, which may conveniently comprise a hollow metallic or rubber element, or a solid foam rubber or foam elastomeric element. The essential requirement is that the valve element 70 be floatable in the heat transfer fluid and be capable of achieving a seal with the valve seat surface 66.

Valve element 70 may be conveniently retained within the enlarged open end 64a of the vent tube 64 by the assemblage of a wire cage 72 around such opened end, which may be engaged behind the shoulder 65a defined between the enlarged portion 65 and the normal diameter portion of the tube 64.

With the aforedescribed valving arrangement provided in the end of the vent tube 64, it is assured that the space 23 within the solar energy absorbing tube 14 will be filled to nearly its full capacity by fluid supplied through the manifold 34. The air displaced by such filling passes readily through the vent tube 64, since the valve element 70 will, by gravity, be displaced from its sealing position with respect to the valve seat 66. However, when the level of the fluid in the chamber 23 reaches approximately the level of the valve seat 66, the floatable valve element 70 is elevated into sealing engagement with such valve seat, thereby preventing further venting of air from the chamber 23 and producing a sharp increase in pressure in the fluid pumping system to which the manifold 34 is connected. Such pressure increase may be readily detected by conventional sensors (not shown) which are actuated to cut off the pump when a pressure increase occurs corresponding to all of the collectors 14 being filled with the heat transfer fluid.

After a suitable time interval to assure the heating of the heat transfer fluid within each solar collector 14, or in response to temperature sensors (not shown) provided in the collecting apparatus in conventional fashion, the fluid connections to manifold 34 are opened by the operation of suitable valves (not shown), described and illustrated in detail in the aforementioned Frissora et al. U.S. Pat. No. 4,232,655, to permit the complete drainage of the heated heat transfer fluid from each of the chambers 23. Such drainage movement of the heat transfer fluid effects an immediate unseating of the valve element 70 from its seat 66, hence the fluid passage through the vent tube 65 is again fully opened and permits the ready passage of air from the top of the storage tank to which the air header 33 is connected.

Thus, the application of this invention not only provides complete protection against the accidental overfilling of the inner tube of the solar collector, resulting in a siphoning action, but also functions to positively cut off the filling of each solar collector when the desired level of fill has been reached. Moreover, during the filling, the top portion of each chamber 23 of each collector 14 is freely vented through the air header 33 to the top of the energy storage and transfer tank (not shown). Upon withdrawal of the heated fluid from the chambers 23 of the solar collecting tubes 14, the valve element 70 is immediately removed from its seat, and an unimpeded drainage flow is provided to assure the complete discharge of fluid by gravity from each of the chambers 23 of the solar collector tubes 14.

Further modifications of this invention will be readily apparent to those skilled in the art and it is intended that the scope of the invention be determined solely by the appended claims.

What is claimed is:

1. In a solar energy conversion apparatus of the type wherein a heat transport liquid is repeatedly transferred between a solar energy collection area defined by a plurality of solar energy collectors and a thermal energy storage and exchange device, each solar energy collector comprising a double walled tubular element being closed at one end and having a sealed, evacuated space between the walls, means for positioning the double walled tubular element in an inclined position with the remaining open end of the inner tube disposed at the lower end, and means for supplying and removing heat transfer fluid to the bottom open end of the inner walled tube, the improvement comprising: a venting conduit disposed in said inner tube and having an open end disposed in the top portion of said inner tube, and valve means responsive to the height of heat transfer fluid in said inner conduit for closing said open end of said vent tube, thereby freely venting the top portions of the inner tube during filling and removal of heat transfer fluid and preventing the complete filling of said inner tube with heat transfer fluid.

2. The improvement defined in claim 1 wherein the top end of said vent conduit is bent into a reverse loop configuration, with the open end thereof facing downwardly, and said valve means is disposed in said downwardly disposed open end.

3. The improvement of claim 2 wherein said open end of said vent conduit is radially enlarged to provide an annular valve seat, and said valve means comprises a floatable ball seatable on said annular valve seat.

* * * * *